US008888449B2

(12) United States Patent
Swenson et al.

(10) Patent No.: US 8,888,449 B2
(45) Date of Patent: Nov. 18, 2014

(54) SYSTEM, TRANSITION CONDUIT, AND ARTICLE OF MANUFACTURE FOR DELIVERING A FLUID FLOW

(75) Inventors: Kendall Roger Swenson, Lawrence Park, PA (US); Jonathan Nagurney, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 766 days.

(21) Appl. No.: 13/106,179

(22) Filed: May 12, 2011

(65) Prior Publication Data

US 2012/0285177 A1 Nov. 15, 2012

(51) Int. Cl.
F01D 9/06 (2006.01)
F02M 25/07 (2006.01)
F02B 37/00 (2006.01)
F02B 29/04 (2006.01)

(52) U.S. Cl.
CPC .......... F02B 37/004 (2013.01); F02M 25/0711 (2013.01); F02M 25/071 (2013.01); Y02T 10/121 (2013.01); Y02T 10/146 (2013.01); F02B 29/0406 (2013.01); Y02T 10/144 (2013.01)
USPC ........................................................ 415/203

(58) Field of Classification Search
CPC ........ F02B 37/004; F02B 37/013; F02D 9/04; Y02T 10/144
See application file for complete search history.

(56) References Cited

U.S. PATENT DOCUMENTS

| 6,062,028 | A | 5/2000 | Arnold et al. |
| 6,739,828 | B2 * | 5/2004 | Schneider ......................... 415/1 |
| 6,834,501 | B1 | 12/2004 | Vrbas et al. |
| 7,032,383 | B2 | 4/2006 | Weber |
| 7,644,585 | B2 | 1/2010 | Haugen |
| 7,828,517 | B2 * | 11/2010 | Serres ........................ 415/157 |
| 2006/0042246 | A1 | 3/2006 | Gray, Jr. et al. |
| 2006/0042247 | A1 | 3/2006 | Haugen |
| 2006/0086090 | A1 | 4/2006 | Kilkenny et al. |
| 2007/0295007 | A1 | 12/2007 | McNulty et al. |
| 2009/0151350 | A1 | 6/2009 | Petitjean |

(Continued)

FOREIGN PATENT DOCUMENTS

| DE | 102008052170 A1 | 4/2010 |
| DE | 102009018583 A1 | 10/2010 |
| EP | 2163746 A2 | 3/2010 |
| EP | 2236791 A1 | 10/2010 |

OTHER PUBLICATIONS

Search Report and Written Opinion from corresponding PCT Application No. PCT/US2012/037513 dated Nov. 27, 2012.

Primary Examiner — Edward Look
Assistant Examiner — Jeffrey A Brownson
(74) Attorney, Agent, or Firm — John A. Kramer; GE Global Patent Operation

(57) ABSTRACT

Various systems and apparatuses are provided for a flow delivery system for an engine. In one example, a system includes a first turbine providing an exhaust flow and a second turbine having an inlet and being fluidically coupled to the first turbine. The second turbine further includes a plurality of nozzle vanes positioned within the inlet of the turbine. A transition conduit is curved about an axis and coupled to the inlet and to the first turbine. The transition conduit is configured to impart an angular momentum component to at least a portion of the exhaust flow, and includes a slot that delivers at least a portion of the exhaust flow to the plurality of nozzle vanes.

24 Claims, 5 Drawing Sheets

(56) References Cited

U.S. PATENT DOCUMENTS

2010/0061843 A1* 3/2010 Anderson et al. ............ 415/183
2010/0202877 A1 8/2010 Sweetland et al.
2010/0319343 A1 12/2010 Arnold et al.
2011/0185724 A1 8/2011 Barth et al.
2012/0031092 A1 2/2012 Sumser et al.

* cited by examiner

SYSTEM, TRANSITION CONDUIT, AND ARTICLE OF MANUFACTURE FOR DELIVERING A FLUID FLOW

FIELD

Embodiments of the invention relate to flow delivery systems for a turbocharger system in an engine. Other embodiments relate to apparatuses and articles of manufacture for controlling a flow of exhaust gas into a turbocharger.

BACKGROUND

In certain turbochargers or other turbine-based systems, exhaust flow may be received in the intake of the turbine in a direction co-axial with the shaft of the turbine. To enable delivery of the flow to the turbine blades at a desired angle of incidence, the axial flow is redirected by nozzle vanes in the turbine inlet to a desired flow direction that is angled with respect to the turbine shaft.

In some examples, turbocharger systems may include two turbochargers configured in series, such as a high pressure turbocharger fluidically coupled to a low pressure turbocharger. The exhaust of the turbine of the high pressure turbocharger may be delivered to the intake of the turbine of the low pressure turbocharger. To enable an axial flow into the intake of the low pressure turbine, in one example the high and low pressure turbines may be positioned facing one another with their shafts collinear. Such a configuration may create complicated fluidic coupling requirements between the respective high and low pressure compressors associated with the high and low pressure turbines, as extensive turning and routing of the flow between the compressors may be required. Such fluidic coupling requirements may also increase the packaging space required for the turbocharger system within the associated engine.

In other examples, the high and low pressure turbines may be positioned with their shafts offset from parallel and forming an angle. In such examples, to enable axial flow into the intake of the low pressure turbine, the exhaust flow from the high pressure turbine must be turned through bends of between 0 to 180 degrees. Turning the exhaust flow in this manner may create secondary flows that can lead to undesirable boundary layer separation, pressure losses, and/or non-uniform flow into the low pressure turbine intake. In these configurations, complicated centerbodies may also be necessary to manage the flow into the low pressure turbine intake.

BRIEF DESCRIPTION OF THE INVENTION

In one embodiment, a flow delivery system for an engine includes a first turbine providing an exhaust flow and a second turbine having an inlet and being fluidically coupled to the first turbine. A plurality of nozzle vanes are positioned within the inlet of the second turbine. A transition conduit is curved about an axis and coupled to the inlet and to the first turbine. The transition conduit is configured to impart an angular momentum component to at least a portion of the exhaust flow, and includes a slot that delivers at least a portion of the exhaust flow to the plurality of nozzle vanes.

In one embodiment, the transition conduit allows the exhaust flow to approach the inlet of the second turbine at an angle other than co-axial with respect to the shaft of the second turbine. Such exhaust flow delivery flexibility enables simplified fluidic coupling between the first and second turbines, which in turn decreases the likelihood of undesirable secondary flows into the low pressure turbine intake. Simplified fluidic coupling between the first and second turbines also enables relatively close positioning of the turbines, which reduces packaging space requirements for the turbines and associated fluidic components. By imparting an angular momentum component to the exhaust flow entering the inlet of the second turbine, the configuration of the transition conduit also allows for a simplified nozzle vane design, thereby reducing the cost and complexity of the nozzle vanes and associated flow components.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
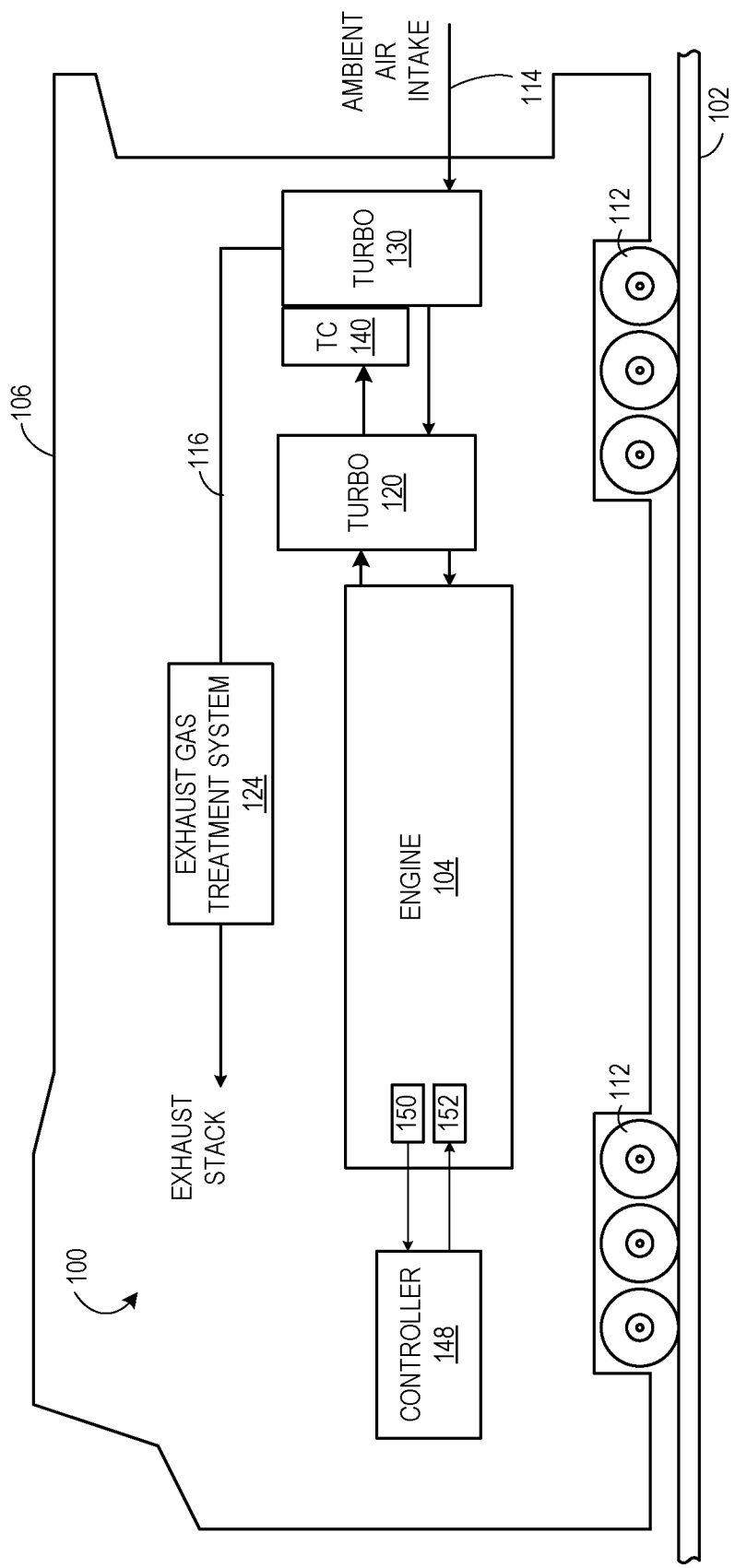
FIG. 1 shows a schematic diagram of an example embodiment of a rail vehicle with a flow delivery system according to an embodiment of the invention.
Figure 2:
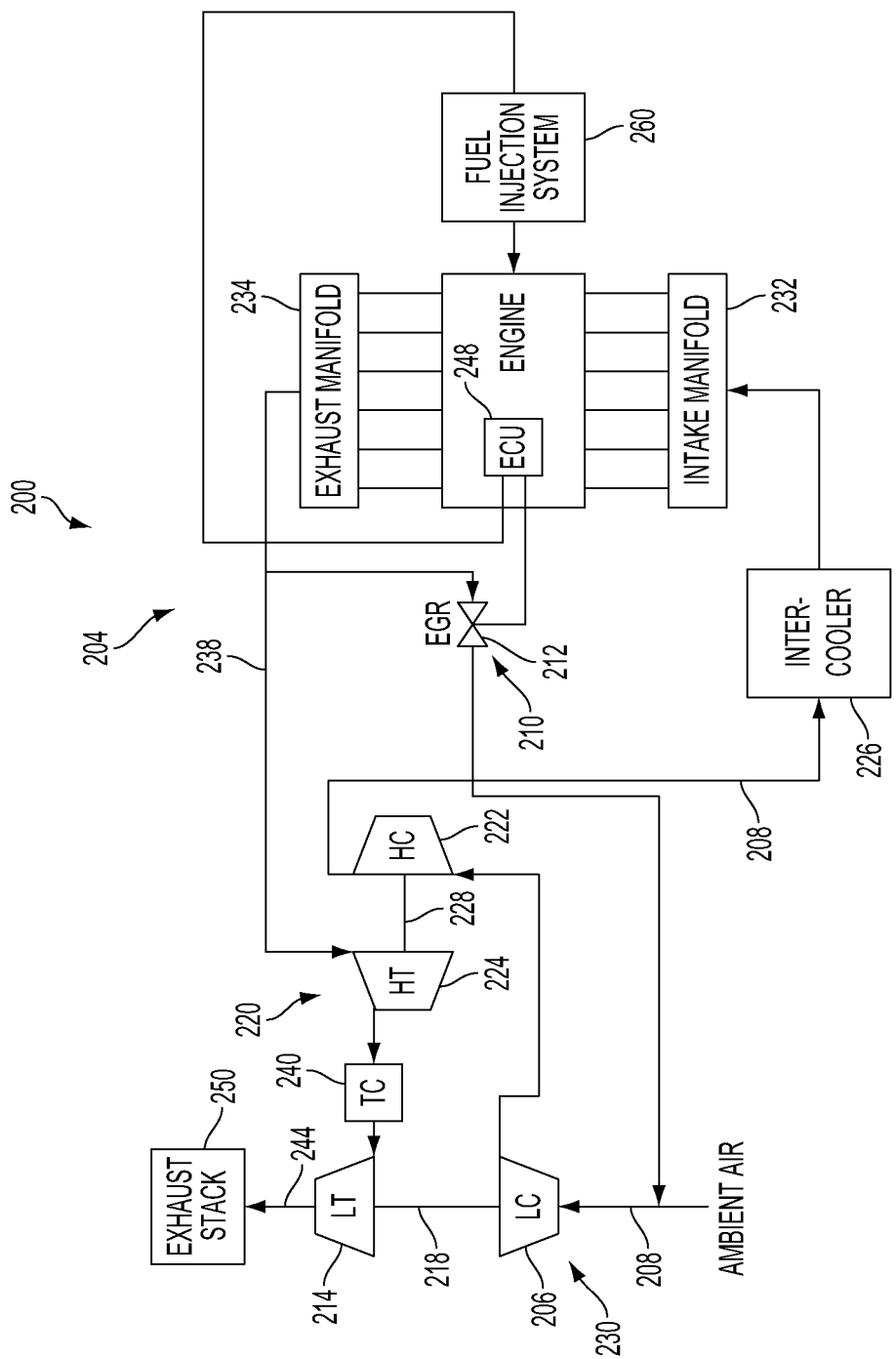
FIG. 2 shows a schematic diagram of an example embodiment of an engine system including an engine with two turbochargers in series.
Figure 3:
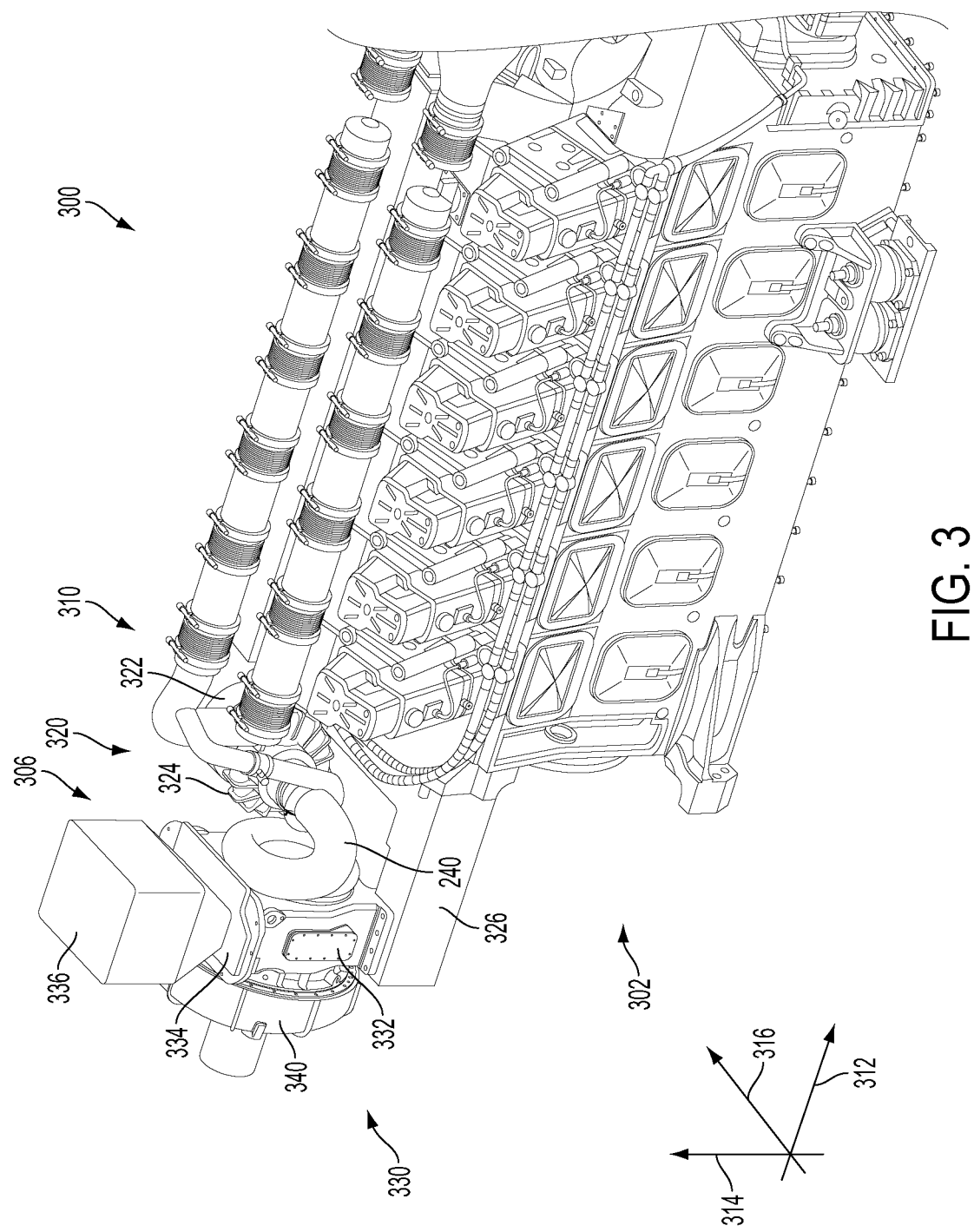
FIG. 3 shows a perspective view, approximately to scale, of an example embodiment of an engine system including an engine and a flow delivery system that includes two turbochargers.
Figure 4:
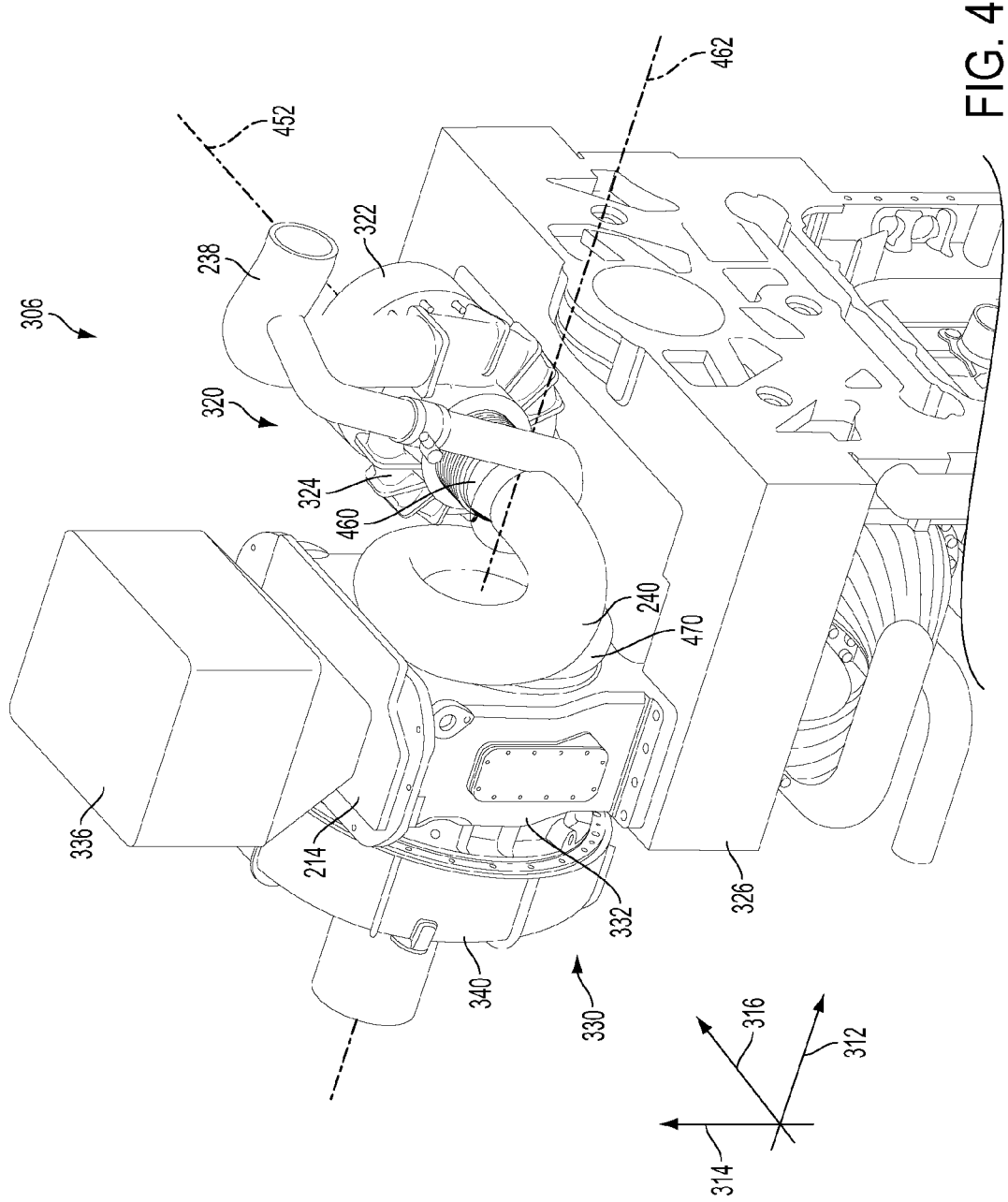
FIG. 4 shows a perspective view, approximately to scale, of an example embodiment of a flow delivery system including two turbochargers.
Figure 5:
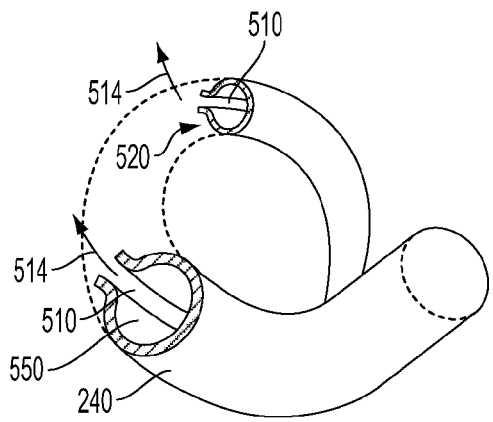
FIG. 5 shows a cut away view of an example embodiment of a transition conduit having a slot.
Figure 6:
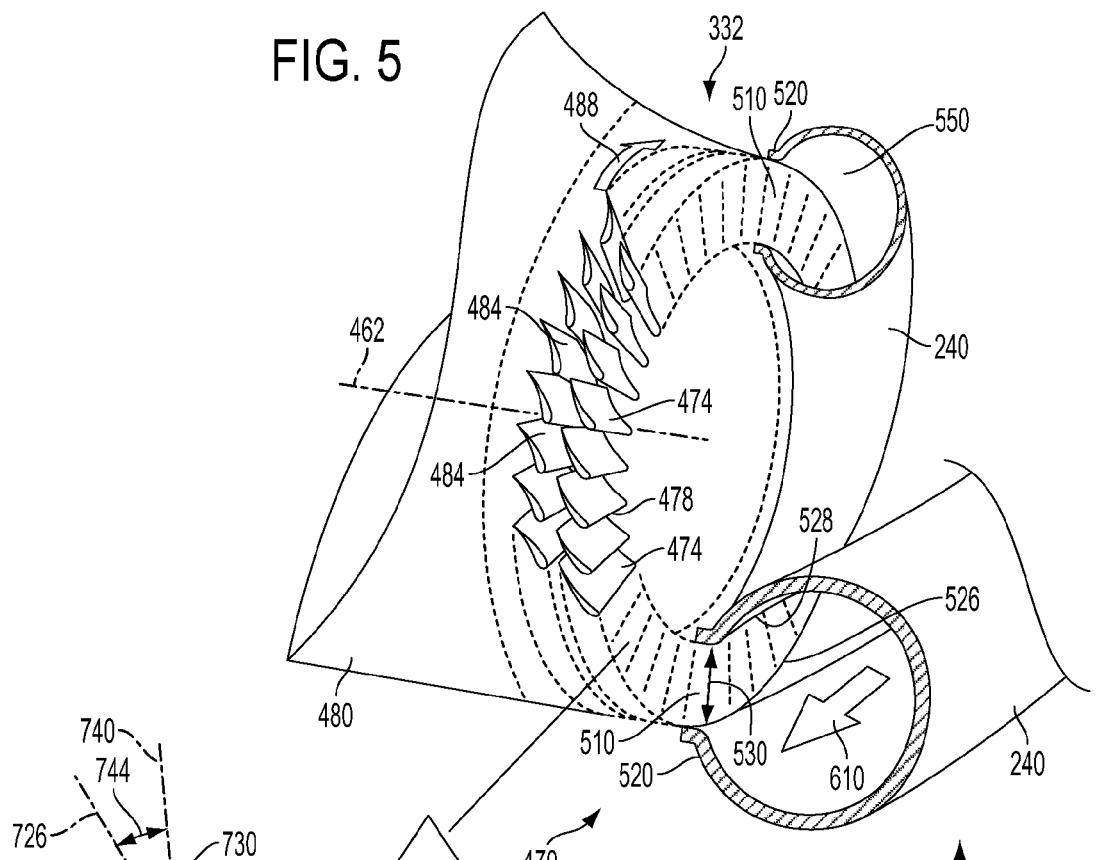
FIG. 6 shows a cut away view of an example embodiment of a transition conduit with a slot that is aligned with nozzle vanes in an inlet of a turbine.
Figure 7:
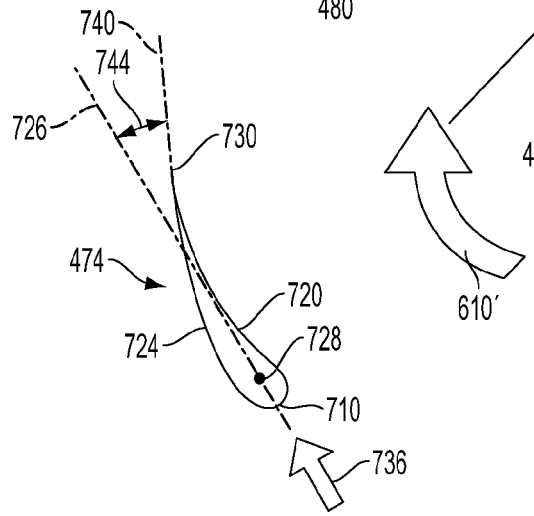
FIG. 7 shows a side view of an example embodiment of a nozzle vane.

The following description relates to various embodiments of a system for delivering a fluid flow to an engine. In some embodiments, the system is configured for an engine in a vehicle, such as a rail vehicle. In other embodiments, other vehicles may be used. FIG. 1 shows a schematic diagram of an example rail vehicle in which the system may be utilized. FIG. 2 shows a schematic diagram of an example embodiment of an engine that may be included in the rail vehicle depicted in FIG. 1. A partial perspective view of an example embodiment of the engine depicted in FIG. 2 is shown in FIG. 3. FIG. 4 shows an example embodiment of the system including two turbochargers that are fluidically coupled by a transition conduit. FIG. 5 is a partial cut away view showing an example embodiment of the transition conduit depicted in FIG. 4. FIG. 6 is a partial cut away view showing an example embodiment of a turbine inlet with a row of nozzle vanes adjacent to a row of turbine blades, and a transition conduit coupled to the inlet with a slot that is aligned with the nozzle vanes. FIG. 7 shows a side view of an example embodiment of a nozzle vane from the row of nozzle vanes depicted in FIG. 6.

FIG. 1 is a block diagram of an example embodiment of a vehicle system, herein depicted as a rail vehicle 106 (such as a locomotive), configured to run on a rail 102 (or set of rails) via a plurality of wheels 112. The rail vehicle 106 includes an engine system 100 with an engine 104. However, in other examples, engine 104 may be a stationary engine, such as in a power-plant application (stationary generator set), or an engine in a ship (marine vessel) propulsion system.

The engine 104 receives intake air for combustion from an intake conduit 114. The intake conduit 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116 and eventually out of an exhaust stack (not shown) of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

The engine system 100 includes a first turbocharger 120 and a second turbocharger 130 ("TURBO") that are configured in series and arranged between the intake conduit 114 and the exhaust passage 116. The first turbocharger 120 and second turbocharger 130 increase air charge of ambient air drawn into the intake conduit 114 in order to provide greater charge density during combustion to increase power output and/or engine-operating efficiency. In one example, the first turbocharger 120 is a relatively smaller, "high pressure" turbocharger that provides boost more quickly and effectively at lower engine speeds by using a higher compressor pressure ratio. Further in this example, the second turbocharger 130 is a relatively larger, "low pressure" turbocharger 130 that provides boost more effectively at higher engine speeds by using a lower compressor pressure ratio. As described in more detail below, a transition conduit 140 ("TC") may be coupled to an inlet (not shown in FIG. 1) of the second turbocharger 130 to deliver exhaust gas flow from the first turbocharger 120 to the second turbocharger 130. A bypass diverter system (not shown in FIG. 1) may also be provided to divert exhaust gas flow around the first turbocharger 120 to the second turbocharger 130 as desired. While in this case two turbochargers in series are included, the system may include additional turbine and/or compressor stages. Further, in other non-limiting embodiments, the first turbocharger 120 and second turbocharger 130 may have substantially equivalent compressor pressure ratios.

In other non-limiting embodiments, the engine system 100 further includes an exhaust gas treatment system 124 coupled in the exhaust passage downstream of the second turbocharger 130. Exhaust gas treatment system 124 may define a plurality of exhaust flow passages (not shown) through which at least a portion of the exhaust gas stream, received from the second turbocharger 130, can flow. Exhaust gas treatment system 124 may address the various combustion by-products released in the exhaust stream during the operation of engine 104.

The rail vehicle 106 further includes a controller 148 to control various components related to the engine system 100. In one example, the controller 148 includes a computer control system. The controller 148 further includes computer readable storage media (not shown) including code for enabling on-board monitoring and control of rail vehicle operation. The controller 148, while overseeing control and management of the engine system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, etc. Correspondingly, the controller 148 may control the engine system 100 by sending commands to various components such as fraction motors, alternator, cylinder valves, throttle, etc.

Turning to FIG. 2, a schematic diagram of an example embodiment of an engine system 200 includes an engine 204, such as the engine 104 described above with reference to FIG. 1, and a first turbocharger 220 and a second turbocharger 230, such as the first and second turbochargers 120 and 130 described above with reference to FIG. 1. As depicted in FIG. 2, ambient air enters a low pressure compressor 206 ("LC") of the second turbocharger 230 through an intake conduit 208. In one embodiment, the ambient air may be mixed with recirculated exhaust gas received from an exhaust gas recirculation ("EGR") system 210 to form a charge-air mixture. The EGR system may include an EGR valve 212 positioned downstream from an exhaust manifold 234 and upstream from the low pressure compressor 206 for controlling the supply of recirculated exhaust gas to the intake conduit 208.

The engine system 200 may also include a controller 248, also referred to as an electronic control unit ("ECU"), that is coupled to various sensors and devices throughout the system. In one embodiment, the controller 248 is coupled to the EGR valve 212 and to the fuel injection system 260. The controller 248 may also be coupled to sensors and control features of other illustrated components of engine system 200.

The ambient air or recirculated exhaust gas/ambient air mixture (hereinafter "charge air") flows through and is compressed by the first-stage low pressure compressor 206 of the second turbocharger 230. The second turbocharger 230 includes a low pressure turbine 214 ("LT") that at least partially drives the low pressure compressor 206 through a shaft 218.

After compression in the low pressure compressor 206, the charge air may flow through a second stage high pressure compressor 222 ("HC") of the first turbocharger 220 that provides additional compression. The first turbocharger 220 includes a high pressure turbine 224 ("HT") that at least partially drives the high pressure compressor 222 through a shaft 228. In other non-limiting embodiments, at least a portion of the charge air may be diverted around the high pressure compressor 222 through a bypass conduit (not shown) and returned to the intake conduit 208 downstream of the high pressure compressor 222.

After passing through the high pressure compressor, the charge air may flow through an intercooler 226 arranged in the intake conduit 208 downstream of the high pressure compressor 222. The intercooler 226 functions as a heat exchanger and cools the charge air in order to further increase the charge air density, which thereby increases the engine operating efficiency.

The charge air then enters an intake manifold 232 of the engine 204 which delivers the charge air to combustion chambers (not shown) of the engine through intake valves (not shown). Fuel from the fuel injection system 260 is injected directly into the combustion chambers. Following combustion in the combustion chambers, exhaust gas leaves the combustion chambers through exhaust valves (not shown) and flows through the exhaust manifold 234 to exhaust conduit 238. A portion of the exhaust gas may also be routed from the conduit 238 to the EGR valve 212. Exhaust gas in the exhaust conduit 238 then flows through the high pressure turbine 224 of the first turbocharger 220. As depicted, the exhaust gas drives the high pressure turbine 224, such that the turbine rotates the shaft 228 and drives the high pressure compressor 222. In other non-limiting embodiments, at least a portion of the exhaust gas may be diverted around the high pressure turbine 224 through a bypass conduit (not shown) and returned to the exhaust conduit 238 downstream of the high pressure turbine.

After leaving the high pressure turbine 224, the exhaust gas enters a transition conduit 240 ("TC") that is coupled to an inlet (not shown in FIG. 2) of the low pressure turbine 214. As explained in more detail below, in one embodiment the transition conduit 240 is configured to impart an angular momentum component to at least a portion of the exhaust flow that enters the inlet of the low pressure turbine 214. The exhaust gas drives the low pressure turbine 214 such that the turbine rotates the shaft 218 and drives the low pressure compressor 206. In one embodiment, the shaft 218 coupling the low pressure turbine 214 to the low pressure compressor 206 is perpendicular or substantially perpendicular to the shaft 228 coupling the high pressure turbine 224 to the high pressure compressor 222. ("Substantially perpendicular" means perpendicular or perpendicular but for slight variances due to manufacturing tolerances.) In other embodiments, the shaft 218 may be offset from parallel at angles between 0 and 180 degrees with respect to the shaft 228. As explained in more detail below, an advantage that may be realized in the practice of some embodiments of the described systems and apparatuses is that use of the transition conduit 240 between the high pressure turbine 224 and low pressure turbine 214 allows the two turbines to be positioned relatively close to one another, with their respective shafts angled with respect to one another, to thereby reduce the packaging space required for the two turbines and their respective compressors.

After passing through the low pressure turbine 214, the exhaust gas enters an exhaust passage 244 that eventually leads to an exhaust stack 250. As explained above, in other non-limiting embodiments an exhaust gas treatment system (not shown in FIG. 2) may also be coupled in the exhaust passage 244 downstream of the low pressure turbine 214. The exhaust gas treatment system may address the various combustion by-products released in the exhaust stream during the operation of engine 204.

Turning to FIG. 3, an engine system 300 is shown that includes an engine 302 such as the engine 204 described above with reference to FIG. 2. FIG. 3 is approximately to-scale. In the example of FIG. 3, engine 302 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIG. 3, and in FIGS. 4 and 6, the longitudinal direction is indicated by 312, the vertical direction is indicated by 314, and the lateral direction is indicated by 316. Each bank of cylinders includes a plurality of cylinders. Each of the plurality of cylinders includes an intake valve which is controlled by a camshaft to allow a flow of compressed intake air to enter the cylinder for combustion. Each of the cylinders further includes at least one exhaust valve which is controlled by the camshaft to allow a flow of combusted gases (e.g., exhaust gas) to exit the cylinder. In the example embodiment of FIG. 3, the exhaust gas exits the cylinder and enters an exhaust manifold positioned within the V (e.g., in an inboard orientation). In other embodiments, the exhaust manifold may be in an outboard orientation, for example, in which the exhaust manifold is positioned outside of the V.

The engine system 300 further includes an example embodiment of a flow delivery system 306 that comprises a first, high pressure turbocharger 320 and a second, low pressure turbocharger 330 mounted on a cantilevered shelf 326 on a first end 310 of the engine 302. In the example of FIG. 3, the first end 310 of the engine is facing toward a left side of the page. As depicted in the example embodiment of FIG. 3, the second turbocharger 330 includes a low pressure turbine 332 coupled to a low pressure compressor 340 by a shaft (not shown in FIG. 3), and the first turbocharger 320 includes a high pressure turbine 324 coupled to a high pressure compressor 322 by a shaft (not shown in FIG. 3). As explained in more detail below, a transition conduit 240, such as the transition conduit 240 depicted in FIG. 2, fluidically couples the high pressure turbine 324 to the low pressure turbine 332. The low pressure turbine 332 includes a turbine outlet 334 arranged to provide a vertical exit flow path for the exhaust gas discharged by the turbine. The turbine outlet 334 is coupled to a muffler 336 that is positioned such that it is aligned in parallel with the vertical axis of the engine. In such a configuration, exhaust gas that exits the turbine outlet 334 flows upward, and away from the engine, in the vertical direction 314.

Turning to FIG. 4, a perspective view of an example embodiment of a flow delivery system 306, such as the flow delivery system 306 shown in FIG. 3, is provided. The flow delivery system 306 includes a first, high pressure turbine 324 and a second, low pressure turbine 332. An exhaust conduit 238 delivers exhaust gas from the exhaust manifold (not shown in FIG. 4) of the engine to the high pressure turbine 324. As described above, the exhaust gas drives the high pressure turbine 324 such that the turbine rotates a shaft (not shown in FIG. 4) that drives the high pressure compressor 322. In one embodiment, the shaft is arranged about an axis 452 that extends in a lateral direction with respect to the engine as indicated by direction arrow 316.

Upon exiting an exhaust flow discharge portion 328 of the high pressure turbine 324, the exhaust flow enters connecting conduit 460 that delivers the flow to a receiving section of a transition conduit 240. At a delivery section of the transition conduit 240, the flow is delivered to an inlet 470 of the low pressure turbine 332. With reference also to FIG. 6, the transition conduit 240 is curved about an axis 462 that extends in a longitudinal direction with respect to the engine as indicated by direction arrow 312. In one embodiment as illustrated in FIG. 4, as viewed from a position looking toward the transition conduit 240 along the axis 462, the transition conduit wraps in a clockwise direction with respect to the shaft (not shown) coupling the low pressure turbine 332 to the low pressure compressor 340, with the shaft extending in a direction parallel to the axis 462. In other non-limiting embodiments, the transition conduit 240 may wrap in a counter-clockwise direction with respect to the shaft (not shown) coupling the low pressure turbine 332 to the low pressure compressor 340. The transition conduit 240 is coupled to the inlet 470 of the low pressure turbine 332, thereby fluidically coupling the exhaust gas flow from the high pressure turbine 324 to the low pressure turbine 332.

With reference now to FIG. 6, within the inlet 470 of the low pressure turbine 332 is a series of non-rotating nozzle vanes 474 arranged in a circular pattern having a curvature about the shaft (not shown) of the turbine and the axis 462. The nozzle vanes 474 are positioned adjacent to a series of turbine blades 484 that are connected to the shaft (not shown) of the low pressure turbine 332. The turbine blades rotate in the direction of action arrow 488 to rotate the shaft about the axis 462. FIG. 6 depicts only some of the nozzle vanes 474 and turbine blades 484, with the remaining nozzle vanes and turbine blades continuing in a circular pattern around the inlet 470 as indicated by dashed lines. As the exhaust flow exits the transition conduit 240 through slot 510 (described in more detail below), the nozzle vanes 474 function as a nozzle to increase the velocity of the exhaust flow entering the inlet 470 by providing a constricted or reduced cross-sectional flow area for the exhaust flow. Additionally, as explained in more detail below, the nozzle vanes 474 are cambered to turn the exhaust gas flow in a desired direction to prepare the exhaust flow for the turbine blades 484. In one embodiment, the nozzle vanes 474 may have a variable geometry capability, such that the position and orientation of the nozzle vanes may be manipulated to regulate the flow of exhaust gas to the turbine blades 484. In other non-limiting embodiments, the nozzle vanes may have a fixed position and orientation. The accelerated exhaust gas flow exiting the nozzle vanes 474 flows over the turbine blades 484 and rotates the blades in the direction of action arrow 488, thereby converting at least a portion of the exhaust flow to a mechanical rotating force.

With reference to FIG. 5, the transition conduit 240 is shown with a portion of the conduit cut away to illustrate the flow of the exhaust gas, generally indicated by arrows 514, exiting a slot 510 in the conduit. In one embodiment the cross section of the transition conduit 240 is cylindrical. In other non-limiting embodiments, the transition conduit 240 may have other cross sectional geometries, including but not limited to elliptical or polygonal. As shown in FIGS. 5 and 6, the slot 510 is centrally located on a first side 520 of the transition conduit 240 that is adjacent to the inlet 470, such that the slot extends along the conduit as the conduit wraps around the outer periphery of the inlet. FIG. 6 illustrates the alignment of the slot 510 with the nozzle vanes 474 in the inlet 470. In this manner, the slot 510 is arranged adjacent to the nozzle vanes 474 such that exhaust flow exiting the slot is delivered to the nozzle vanes. In one embodiment, with reference to FIG. 6 and from a point of view facing the transition conduit 240 along the axis 462, the slot may be formed in the conduit beginning at approximately a six o'clock position and may trace a circular path around the curving conduit to form a ring shape, with the slot ending at a terminating position along the conduit between approximately 335 and 355 degrees or, more specifically, 340 and 350 degrees or, even more specifically, 345 degrees from its beginning position. In other non-limiting embodiments, the slot may be formed in the conduit beginning at a radial position other than approximately a six o'clock position, and may continue around the length of the conduit until ending at a terminating position along the conduit between approximately 335 and 355 degrees or, more specifically, 340 and 350 degrees or, even more specifically, 345 degrees from its beginning position.

In one embodiment illustrated in FIG. 6, an initial edge 526 of the slot 510 may curve downwardly and in a direction of the exhaust gas flow until the initial edge forms a height 530 on the slot with respect to an upper edge 528 of the slot. In another embodiment, a distal portion of the conduit 240 adjacent to the terminating position of the slot 510 may bulge into a proximal portion of the conduit adjacent to the beginning position of the slot. In this embodiment, and with reference to FIG. 6, the distal portion of the conduit 240 may terminate at a position along the slot 510 adjacent to the arrow 530 indicating the width of the slot. It will be appreciated that in this embodiment the dashed lines shown to the right of arrow 530 in FIG. 6, representing leading edges of the nozzle vanes 474, would not be visible.

As shown in FIG. 6, the transition conduit 240 and slot 510 extend in a curvature that is substantially equal to the curvature of the series of nozzle vanes 474. Further, in one embodiment the height 530 of the slot 510 is substantially equal to a height 478 of the nozzle vanes 474. In this manner, the slot 510 is aligned with the nozzle vanes 474 to allow for delivery of the exhaust flow across substantially the entire height 478 of the nozzle vanes. In one embodiment, with reference to FIG. 6 and from a point of view facing the transition conduit 240 along the axis 462, the height 530 of the slot 510 may be constant along its entire length around the transition conduit 240. In other embodiments, the height 530 of the slot 510 may be constant along a portion of its length around the transition conduit 240.

With reference now to FIGS. 4, 5 and 6, the exhaust flow enters the transition conduit 240 from the connecting conduit 460 in a substantially lateral direction and parallel to direction arrow 316. At this point in the exhaust flow, as indicated by arrow 610, the exhaust flow has a substantially linear or "straight line" momentum. As the transition conduit 240 begins curving upward in a direction toward direction arrow 314, the curvature of the conduit imparts an angular momentum component to at least a portion of the exhaust flow 610'. At any position locally around the curvature of the transition conduit 240, the angular momentum component of the exhaust flow will be substantially orthogonal to the shaft (not shown) of the low pressure turbine 332 and the axis 462. Additionally, the curvature of the conduit 240, along with a decreasing cross sectional area 550 of the conduit as described below, establish a relatively constant angular momentum component in at least a portion of the exhaust flow 610' around the length of the curving conduit. For example, in one embodiment the angular momentum component may vary between approximately 0%-3% around the length of the curving conduit 240.

As shown in FIGS. 5 and 6, the transition conduit 240 has a cross section with an area 550 that decreases in a direction of the exhaust flow through the conduit. For example, with reference to FIGS. 5 and 6 and as viewed from a position looking toward the transition conduit 240 along the axis 462, in one embodiment the cross sectional area 550 of the transition conduit 240 decreases beginning from a six o'clock position and continues decreasing around the entire length of the curving conduit. In this manner, the transition conduit 240 may be characterized as a funnel. In one embodiment, the cross sectional area of the transition conduit 240 may decrease from a maximum of approximately 323 $cm^2$ to a minimum of approximately 19 $cm^2$. In one embodiment, while the cross sectional area of the transition conduit 240 decreases in a direction of the exhaust flow, the height 530 of the slot 510 in the conduit remains constant around the curvature of the conduit to match the height 478 of the nozzle vanes 474. As the cross sectional area of the transition conduit 240 decreases, the exhaust flow is forced to exit the conduit through the slot 510 in an axial direction toward the nozzle vanes 474. In this manner, the transition conduit 240 also imparts an axial momentum component to at least a portion of the exhaust flow in a direction toward the nozzle vanes 474 and substantially parallel to the shaft (not shown) of the low pressure turbine 332 and the axis 462. It will be appreciated that the vector sum of the angular and axial momentum components of the exhaust flow exiting the slot 510 combine to represent the actual motion of the exhaust flow as it approaches the nozzle vanes 474.

As noted above, in one embodiment the conduit 240 establishes a relatively constant angular momentum component in at least a portion of the exhaust flow 610' around the length of the curving conduit. In another example embodiment, it may be desirable to configure the conduit 240 to impart an angular momentum component that varies around the length of the curving conduit in at least a portion of the exhaust flow 610'. In one embodiment, ducting 480 downstream from the nozzle vanes 474 and turbine blades 484 may impose a non-uniform pressure field on the exhaust flow 610' as it exits the turbine blades. Such non-uniform pressure field may create undesirable flow losses in the nozzle vanes 474 and turbine blades 484. In this embodiment, varying the cross sectional area 550 of the conduit 240 in a non-uniform manner along the length of the conduit may create an angular momentum component that varies by an amount between approximately 3%-20% around the length of the curving conduit in at least a portion of the exhaust flow 610'. Imparting such varying angular momentum in at least a portion of the exhaust flow 610' may reduce the flow losses created by the non-uniform pressure field described above.

An advantage that may be realized in the practice of some embodiments of the described systems and apparatuses is that the transition conduit 240 allows the exhaust flow to approach the inlet 470 of the low pressure turbine 214 at an angle other than co-axial with respect to the shaft 218 of the low pressure turbine. In this manner, the transition conduit 240 enables simplified fluidic coupling between the high pressure turbine 224 and the low pressure turbine 214, an example of which is the single straight connecting conduit 460 connecting the high pressure turbine 224 to the transition conduit 240 as depicted in FIG. 4. Such simplified fluidic coupling also enables the high pressure turbine 224 to be positioned relatively close to the low pressure turbine 214, which reduces packaging space requirements for the turbines and their associated compressors. Simplified fluidic coupling enabled by the transition conduit 240 also reduces the likelihood of undesirable secondary flows into the low pressure turbine 214, which may otherwise be created by more complicated fluidic couplings that turn the exhaust flow between the high pressure turbine 224 and the low pressure turbine.

With reference now to FIG. 7, a side view of an example embodiment of a nozzle vane 474 is provided. As shown in FIG. 7, the nozzle vane 474 is cambered such that it includes a concave surface 720 and a convex surface 724 that are joined at a first end by a rounded leading edge 710 and at a second end by a trailing edge 730. The trailing edge may be oriented such that exhaust gas flowing over the nozzle vane 474 leaves the trailing edge and flows substantially in the direction of a trailing edge axis 740 toward an adjacent turbine blade 484 (not shown in FIG. 7). In one embodiment, the trailing edge 730 and trailing edge axis 740 are oriented such that exhaust flow leaving the trailing edge impacts a leading edge of the turbine blade 484 at a zero degree angle of incidence.

As shown in FIG. 7, exhaust gas flow leaving the slot 510, represented by flow arrow 736, includes an angular momentum component that directs the flow toward the leading edge 710 of the nozzle vane 474. More specifically, the flow 736 approaches the leading edge 710 along a leading edge axis 726 that extends from the leading edge 710 through the center of curvature 728 of the leading edge 710. The leading edge axis 726 and the trailing edge axis 740 form a turning angle 744. The leading edge axis 726 also corresponds to an angle of incidence of the exhaust flow 736 with respect to the leading edge 710. In one embodiment, it is preferable for the angle of incidence of the exhaust flow 736 with respect to the leading edge 710 to be approximately zero degrees. Assuming a given orientation of the trailing edge axis 740, it will be appreciated that the amount of camber required in the concave surface 720 of the nozzle vane 474 is directly related to the turning angle 744 created by the approaching flow 736. It will also be appreciated that a smaller turning angle 744 corresponds to a smaller amount of curvature required in the concave surface 720 of the nozzle vane 474.

An advantage that may be realized in the practice of some embodiments of the described systems and apparatuses is that by imparting an angular momentum component to the exhaust flow 736, a smaller turning angle 744 may be formed with respect to the nozzle vanes 474. Accordingly, less turning of the exhaust flow 736 from its initial flowpath along the leading edge axis 726 may be required. In one embodiment, the exhaust flow 736 may form a turning angle 744 of approximately 45 degrees. As it will be appreciated, as the turning angle decreases, less curvature is required in the concave surface 720 of the nozzle vanes 474. Less curvature in the nozzle vanes 474 allows for reduced complexity in the design of the nozzle vanes 474, which may correspond to easier and more economical manufacturing requirements for the vanes. Less curvature in the nozzle vanes 474 may also allow for the use of fewer nozzle vanes in a turbine, thereby reducing manufacturing costs of the turbine. Another advantage that may be realized in the practice of some embodiments of the described systems and apparatuses is that less curvature in the nozzle vanes 474 may correspond to a lower likelihood of flow issues, such as flow losses, flow separation, etc.

As noted above and with reference to FIG. 1, in other non-limiting embodiments the transition conduit 140 may be utilized in an engine system 100 that includes an exhaust gas treatment system 124 downstream of the second turbocharger 130. Exhaust gas treatment system 124 may define a plurality of exhaust flow passages (not shown) through which at least a portion of the exhaust gas stream, received from the second turbocharger 130, can flow. Exhaust gas treatment system 124 may address the various combustion by-products released in the exhaust stream during the operation of engine 104. In one example embodiment, and with reference also to FIG. 6, the configuration of the transition conduit 240 and ducting 480 downstream from the nozzle vanes 474 and turbine blades 484 may be designed to improve a flow velocity pattern of the exhaust stream delivered to the exhaust gas treatment system 124. An advantage that may be realized in the practice of some embodiments of the transition conduit 240 utilized in conjunction with an exhaust gas treatment system 124 is that a flow velocity pattern created by the transition conduit in combination with the ducting 480 may improve the space velocity or residence time of the exhaust stream in the exhaust gas treatment system 124.

Thus, a flow delivery system and apparatus including a transition conduit may be provided with an engine system in a vehicle, such as a locomotive or other rail vehicle. Packaging constraints in the engine system may require close coupling of a first and second turbocharger. The transition conduit fluidically couples the exhaust gas flow of a turbine of the first turbocharger to a turbine of the second turbocharger. The transition conduit is curved about an axis and configured to enable close coupling of the first and second turbocharger. The transition conduit is also configured to impart an angular momentum component to the exhaust gas flow. In this manner, the turbine of the second turbocharger may require fewer nozzle vanes to direct the exhaust gas flow received from the transition conduit, with such nozzle vanes also having a less complex design. Accordingly, manufacturing costs of the nozzle vanes and associated turbine may be reduced.

Another embodiment relates to a transition conduit. The transition conduit comprises a funnel that curves around a central axis. The funnel further includes an intake section for receiving a fluid flow and a delivery section for discharging the fluid flow. The funnel is configured to impart an angular momentum component to at least a portion of the fluid flow. The funnel is further configured to include a cross section that decreases in a direction from the intake section to the delivery section. The funnel further includes a slot in the delivery section. In operation, the decreasing cross section of the funnel imparts an axial momentum component to the fluid flow that discharges the flow from the slot in the delivery section. The angular momentum component imparted to the fluid flow improves the orientation of the flow as the flow is discharged from the slot.

Another embodiment relates to an article of manufacture. The article includes a first turbine that provides an exhaust flow from a discharge portion, and a second turbine having an inlet portion with a plurality of nozzle vanes. The article further includes a transition conduit fluidically coupled to the discharge portion of the first turbine and to the inlet portion of the second turbine. The transition conduit is configured to create an angular momentum component and an axial momentum component in the exhaust flow. The transition conduit further includes a slot that delivers the exhaust follow to the plurality of nozzle vanes. The transition conduit enables the first and second turbines to be closely coupled to reduce packaging space required for the turbines.

Another embodiment relates to a transition conduit system for transferring a fluid flow (e.g., exhaust gas flow). The transition conduit system comprises a funnel having an intake section for receiving the fluid flow and a delivery section for discharging the fluid flow. The intake section and the delivery section are interconnected and together define an internal passageway of the conduit. The internal passageway has a longitudinal center line extending along a length of the passageway. Along at least a portion of the length of the internal passageway, in the delivery section, the internal passageway is longitudinally curved along the center line. That is, the longitudinal center line of the passageway, extending along at least a portion of the length of the passageway, is curved. A lateral cross section of the internal passageway decreases from at least a first position to a second position, in a direction extending from the intake section towards the delivery section. For example, at least the delivery section of the funnel may have a decreasing lateral cross section, that is, a lateral cross section of the delivery section closer to the intake section is larger than a lateral cross section of the delivery section longitudinally further away from the intake section, with there being a gradual, narrowing transition between the two. The delivery section has a slot formed therein. The slot establishes a flow path from the internal passageway to external the funnel. The slot is located in a side of the delivery section located radially to the longitudinal center line of the internal passageway (e.g., a major plane defined by the opening of the slot is parallel or about parallel to the longitudinal center line; the major plane is generally shown by the radially-disposed dashed lines generally pointed to at 510 in FIG. 6).

In another embodiment of the transition conduit system, the funnel is the same as described in the section immediately above, but is further adapted for transferring a fluid flow from a first engine component to a second engine component in an internal combustion engine system. For example, the intake section may be configured for receiving the fluid flow from a high pressure turbine of a first turbocharger in an engine system (e.g., the intake section may be dimensioned for mating with an output of the high pressure turbine), and the delivery section may be configured for discharging the fluid flow to a low pressure turbine of a second turbocharger of the engine system (e.g., the delivery section may be dimensioned for mating with an input of the low pressure turbine).

In another embodiment of the transition conduit system, the funnel is the same as described in either of the two sections immediately above, and further, the curved internal passageway is volute in shape. That is, as the internal passageway extends along the longitudinal center line, the internal passageway curves and wraps back around towards itself. (It may also be the case that as the passageway wraps back around towards itself, the longitudinal center line of the passageway is not uni-planar; that is, the internal passageway is generally helical.) The slot is elongate, and extends along the side of the delivery section along at least part of the curved length of the internal passageway, such that the major plane of the slot is at least arc shaped, e.g., arc shaped or, in an embodiment, if the slot curves back around towards itself, ring shaped. In another embodiment, the slot decreases in height along the length of the longitudinal center line of the internal passageway. That is, for example, a height of the opening of the slot (see 530 in FIG. 6) gradually decreases in magnitude in a direction extending from the intake section to the delivery section, e.g., a first height at a point closer to the intake section, and a second, smaller height closer to the delivery section.

In another embodiment of the transition conduit system, such as described in any of the three sections immediately above, the system further comprises a plurality of fixed (non-moving) nozzle vanes positioned in or proximate to the slot of the funnel delivery section. For example, the nozzle vanes may be positioned on an output side of the slot, and disposed in a path of the fluid flow that would flow from the internal passageway, through the slot, and out the slot when the system is in operation for transferring the fluid flow. The nozzle vanes are shaped to function as a nozzle to increase the velocity of the fluid flow exiting the slot by providing a constricted or reduced cross-sectional flow area for the fluid flow.

In another embodiment of a transition conduit system for transferring a fluid flow (e.g., exhaust gas flow), the transition conduit system comprises a conduit body having an intake section for receiving the fluid flow and a delivery section for discharging the fluid flow. The intake section and the delivery section are interconnected and together define an internal passageway of the conduit. Along at least a portion of the length of the internal passageway, in the delivery section, the internal passageway is longitudinally curved, and, more specifically, helical. In the delivery section, the conduit body has a slot formed therein. The slot establishes a flow path from the internal passageway to external the conduit body. The slot is located in a side of the delivery section located radially to a longitudinal center line of the internal passageway. In another embodiment of the transition conduit system, the conduit body is funnel-shaped, meaning along at least part of the length of the internal passageway (such as along at least part of the delivery section), a lateral cross section of the internal passageway decreases in a direction extending from the intake section towards the delivery section. In another embodiment of the transition conduit system, the system further comprises a plurality of fixed (non-moving) nozzle vanes positioned in or proximate to the slot. For example, the nozzle vanes may be positioned on an output side of the slot, and disposed in a path of the fluid flow that would flow from the internal passageway, through the slot, and out the slot when the system is in operation for transferring the fluid flow.

The nozzle vanes are shaped to function as a nozzle to increase the velocity of the fluid flow exiting the slot by providing a constricted or reduced cross-sectional flow area for the fluid flow.

Another embodiment relates to an engine system. The engine system comprises a first turbocharger, a second turbocharger, and a longitudinally curved funnel. The longitudinally curved funnel has an intake section connected to an output of a high pressure turbine of the first turbocharger, for receiving a fluid flow (e.g., exhaust gas flow) from the high pressure turbine of the first turbocharger. The funnel also has a delivery section connected to an input of a low pressure turbine of the second turbocharger, for delivering the fluid flow to the low pressure turbine of the second turbocharger. The intake section and the delivery section of the funnel are interconnected and together define an internal passageway for delivering the fluid flow. The internal passageway has a longitudinal center line extending along a length of the passageway. Along at least a portion of the length of the internal passageway, in the delivery section, the internal passageway is longitudinally curved along the center line. That is, the longitudinal center line of the passageway, extending along at least a portion of the length of the passageway, is curved. A cross section of the internal passageway decreases from at least a first position to a second position, in a direction extending from the intake section towards the delivery section. The delivery section has a slot formed therein. The slot establishes a flow path from the internal passageway to the input of the low pressure turbine of the second turbocharger. The slot is located in a side of the delivery section located radially to the longitudinal center line of the internal passageway (e.g., a major plane defined by the opening of the slot is parallel or about parallel to the longitudinal center line; the major plane is generally shown by the radially disposed dashed lines generally pointed to at 510 in FIG. 6).

In another embodiment of the engine system, the longitudinally curved funnel is the same as described in the section immediately above, and further, the curved internal passageway is volute in shape. That is, as the internal passageway extends along the longitudinal center line, the internal passageway curves and wraps back around towards itself (It may also be the case that as the passageway wraps back around towards itself, the longitudinal center line of the passageway is not uni-planar; that is, the internal passageway is generally helical.) The slot is elongate, and extends along the side of the delivery section along at least part of the curved length of the internal passageway, such that the major plane of the slot is at least arc shaped, e.g., arc shaped or, in an embodiment, if the slot curves back around towards itself, ring shaped. In another embodiment, the slot decreases in height along the length of the longitudinal center line of the internal passageway. That is, for example, a height of the opening of the slot (see 530 in FIG. 6) gradually decreases in magnitude in a direction extending from the intake section to the delivery section, e.g., a first height at a point closer to the intake section, and a second, smaller height closer to the delivery section.

In another embodiment of the engine system, such as described in either of the two sections immediately above, the system further comprises a plurality of fixed (non-moving) nozzle vanes positioned in or proximate to the slot of the funnel delivery section. For example, the nozzle vanes may be positioned on an output side of the slot (such as in the input of the low pressure turbine of the second turbocharger), and disposed in a path of the fluid flow that would flow from the internal passageway, through the slot, and out the slot when the system is in operation for transferring the fluid flow. The nozzle vanes are shaped to function as a nozzle to increase the velocity of the fluid flow exiting the slot by providing a constricted or reduced cross-sectional flow area for the fluid flow.

In an embodiment, such as in any of the other embodiments described herein, the slot of the delivery section is the sole egress for fluid flow through the conduit body, e.g., funnel.

In an embodiment, such as in any of the other embodiments described herein, the slot of the delivery section is elongate, and a long axis of the slot, defined by a longest dimension of the slot, is generally parallel (parallel but for variances due to manufacturing variances/tolerances) to the longitudinal center line of the internal passageway of the conduit body, e.g., funnel.

In any of the embodiments set forth herein, the nozzle vanes may be fixed/stationary, meaning not moving within the reference frame of the turbocharger with which they are associated.

Another embodiment relates to a transition conduit for transferring a fluid flow. The transition conduit comprises a funnel curving around a central axis, e.g., the funnel is longitudinally curved, as defined by a longitudinal center axis of the funnel being curved. The funnel has an intake section for receiving the fluid flow and a delivery section for discharging the fluid flow. A cross section of the funnel decreases in a direction along the curving funnel from at least a first position to a second position. The funnel has a slot located (e.g., centrally located) along a side of the funnel in the delivery section. The slot traces a circular path around the central axis of the curving funnel to form a ring shape, which is generally parallel to the longitudinal center axis of the funnel. The slot establishes a path for fluid flow to exit the delivery section through the slot when the transition conduit is used for transferring the fluid flow.

Another embodiment relates to a transition conduit for transferring a fluid flow. The transition conduit comprises a conduit body having an intake section for receiving the fluid flow and a delivery section for discharging the fluid flow. The intake section and delivery section define an internal passageway having a longitudinal center line. Along at least a portion of a length of the internal passageway, in the delivery section, the internal passageway is longitudinally curved along the center line. The conduit body has an elongate slot formed therein. The slot is located in the delivery section. The slot establishes a flow path from the internal passageway to external the conduit body. The slot has a long axis generally parallel to the center line of the internal passageway. In another embodiment, the longitudinally curved portion of the internal passageway is helical. In another embodiment, a lateral cross section of the internal passageway, in the delivery section, decreases in a direction extending from the intake section towards the delivery section. In another embodiment, the transition conduit further comprises a plurality of nozzle vanes disposed in or by an exit or output side of the slot, in a path of fluid flow that would pass from the internal passageway through the slot when the transition conduit is used for transferring a fluid flow.

As used in the description above, the terms "high pressure" and "low pressure" are relative, meaning that "high" pressure is a pressure higher than a "low" pressure. Conversely, a "low" pressure is a pressure lower than a "high" pressure.

In this written description, references to "one embodiment" or "an embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A flow delivery system for an engine, comprising:
a first turbine having an exhaust flow discharge portion;
a second turbine having an inlet;
a plurality of nozzle vanes positioned within the inlet; and
a transition conduit coupled to the inlet and to the discharge portion, the transition conduit establishing a fluid connection between the first turbine and the second turbine, wherein the transition conduit is curved about an axis and is configured to impart an angular momentum component to at least a portion of an exhaust flow, the transition conduit having a slot that establishes a path for delivering the at least a portion of an exhaust flow to the plurality of nozzle vanes, where a height of an opening of the slot is perpendicular to the axis, the height extending across the opening.

2. The flow delivery system of claim 1, wherein a first shaft of the first turbine and a second shaft of the second turbine are offset from parallel to one another.

3. The flow delivery system of claim 2, wherein the first shaft and the second shaft are substantially perpendicular.

4. The flow delivery system of claim 1, wherein the slot is located on a first side of the conduit adjacent to the plurality of nozzle vanes, the first side facing ducting downstream from the plurality of nozzle vanes.

5. The flow delivery system of claim 4, wherein the slot extends around at least a portion of the conduit and wherein the slot is centrally located on the first side of the conduit with respect to a longitudinal center axis of the conduit.

6. The flow delivery system of claim 5, wherein the plurality of nozzle vanes are arranged in a circular pattern having a curvature, and the slot extends in a curvature that is substantially equal to the curvature of the plurality of nozzle vanes to align the slot with the nozzle vanes around at least a portion of the inlet.

7. The flow delivery system of claim 6, wherein the slot traces a circular path around the conduit to form a ring shape.

8. The flow delivery system of claim 1, wherein the height of the opening of the slot is substantially equal to a height of the plurality of nozzle vanes, the height of the plurality of nozzle vanes, along a leading edge of the plurality of nozzle vanes, perpendicular to the axis.

9. The flow delivery system of claim 8, wherein the height of the slot is constant along a length of the slot and wherein each of the plurality of nozzle vanes has the leading edge and a trailing edge, the trailing edge positioned axially downstream from the leading edge.

10. The flow delivery system of claim 1, wherein the transition conduit has a cross section with an area that decreases in a direction of the exhaust flow through the conduit, the decreasing area of the cross section of the conduit forcing exhaust flow to exit the conduit through the slot in an axial direction toward the plurality of nozzle vanes, the conduit configured to also impart an axial momentum component to the at least a portion of the exhaust flow that exits the slot.

11. The flow delivery system of claim 10, wherein the angular momentum component is orthogonal to the axis, and the axial momentum component is parallel to the axis.

12. The flow delivery system of claim 11, wherein the cross section of the transition conduit is cylindrical.

13. The flow delivery system of claim 1, wherein each of the plurality of nozzle vanes is cambered and wherein the plurality of nozzle vanes are aligned radially with turbine blades of the second turbine.

14. The flow delivery system of claim 1, wherein the transition conduit wraps in a clockwise direction with respect to a shaft of the second turbine as the conduit approaches the inlet of the second turbine.

15. A transition conduit for transferring a fluid flow, comprising:
a funnel curving around a central axis, the funnel having an intake section for receiving the fluid flow and a delivery section for discharging the fluid flow in a direction parallel to the central axis, the funnel configured to impart an angular momentum component to at least a portion of the fluid flow;
a cross section of the funnel decreasing in a direction along the curving funnel from at least a first position to a second position; and
the funnel having a slot centrally located along a side of the funnel in the delivery section, the slot tracing a circular path around the central axis of the curving funnel to form a ring shape, the slot establishing a path for the fluid flow to exit the delivery section in the direction parallel to the central axis.

16. The transition conduit of claim 15, wherein the slot has a height that is constant along at least a portion of the delivery section, the height perpendicular to the central axis, the height extending across an opening of the slot.

17. The transition conduit of claim 15, wherein the cross section of the funnel is cylindrical.

18. The transition conduit of claim 15, wherein the funnel wraps in a clockwise direction from the intake section to the delivery section with respect to the central axis.

19. An article of manufacture, comprising:
a first turbine having an exhaust flow discharge portion;
a second turbine having an inlet;
a plurality of nozzle vanes positioned within the inlet; and
a transition conduit coupled to the inlet and to the discharge portion, the transition conduit establishing a fluid connection between the first turbine and the second turbine, wherein the transition conduit is curved about an axis and configured to impart an angular momentum component and an axial momentum component to at least a portion of an exhaust flow, the transition conduit having a slot that establishes a path for delivering the at least a portion of an exhaust flow in an axial direction to the plurality of nozzle vanes, the slot located on a first side of the transition conduit adjacent to the plurality of nozzle vanes and facing ducting downstream from the plurality of nozzle vanes, where a height of an opening of the slot is perpendicular to the axis, the height extending across the opening.

20. A transition conduit for transferring a fluid flow, comprising:
- a funnel curving around a central axis, the funnel having an intake section for receiving the fluid flow and a delivery section for discharging the fluid flow;
- a cross section of the funnel decreasing in a direction along the curving funnel from at least a first position to a second position; and
- the funnel having a slot centrally located along a side of the funnel in the delivery section, the slot tracing a circular path around the central axis of the curving funnel to form a ring shape, the slot establishing a path for the fluid flow to exit the delivery section in a direction parallel to the central axis, where a height of the slot is perpendicular to the central axis.

21. The transition conduit of claim 20, wherein the delivery section of the funnel is fluidically coupled to an inlet having a plurality of nozzle vanes, and the slot is aligned with the plurality of nozzle vanes around at least a portion of the inlet to deliver at least a portion of the fluid flow to the plurality of nozzle vanes, each of the plurality of nozzle vanes having a leading edge and a trailing edge, the trailing edge positioned downstream in an axial direction from the leading edge and wherein the height extends across an opening of the slot.

22. A transition conduit for transferring a fluid flow, comprising:
- a conduit body having an intake section for receiving the fluid flow and a delivery section for discharging the fluid flow, the intake section and delivery section defining an internal passageway having a longitudinal center line, wherein along at least a portion of a length of the internal passageway, in the delivery section, the internal passageway is longitudinally curved along the center line and around a central axis;
- wherein the conduit body has an elongate slot formed therein, the slot located in the delivery section, the slot establishing a flow path from the internal passageway to external the conduit body in a direction parallel to the central axis, wherein the slot has a long axis generally parallel to the center line of the internal passageway, and wherein a height of an opening of the slot is perpendicular to the central axis.

23. The transition conduit of claim 22, wherein the longitudinally curved portion of the internal passageway is helical and wherein the height extends across the opening.

24. The transition conduit of claim 22, wherein a lateral cross section of the internal passageway, in the delivery section, decreases in a direction extending from the intake section towards the delivery section.

* * * * *

UNITED STATES PATENT AND TRADEMARK OFFICE
CERTIFICATE OF CORRECTION

PATENT NO. : 8,888,449 B2  Page 1 of 1
APPLICATION NO. : 13/106179
DATED : November 18, 2014
INVENTOR(S) : Swenson et al.

It is certified that error appears in the above-identified patent and that said Letters Patent is hereby corrected as shown below:

In the Specification

In Column 4, Line 13, delete "fraction" and insert -- traction --, therefor.

In Column 13, Line 41, delete "itself" and insert -- itself. --, therefor.

Signed and Sealed this
Second Day of June, 2015

Michelle K. Lee
*Director of the United States Patent and Trademark Office*